United States Patent
Lynch et al.

[15] 3,687,522
[45] Aug. 29, 1972

[54] VARIABLE MAGNIFICATION LENS SYSTEM FOR FINITE CONJUGATE DISTANCES

[72] Inventors: Geraldine B. Lynch, Irondequoit; Warren A. Carlough, Brighton, both of N.Y.

[73] Assignee: Ilex Optical Co., Inc., Rochester, N.Y.

[22] Filed: Feb. 1, 1971

[21] Appl. No.: 111,255

[52] U.S. Cl. ................................................. 350/184
[51] Int. Cl. ............................................. G02b 15/00
[58] Field of Search ............. 350/184, 186, 187, 255

[56] References Cited

UNITED STATES PATENTS 3,552,832  1/1971  Demaine ............... 350/184 X
3,439,976  4/1969  Lunch ..................... 350/215

*Primary Examiner*—John K. Corbin
*Attorney*—Charles Shepard and Stonebraker & Shepard

[57] ABSTRACT

A variable magnification lens system particularly useful for process camera work, for copying work, and for general finite conjugate work, such as in microfilming, oscillography, and related fields. Six elements, all air spaced, form a symmetrical lens of the inverse Gauss type. By moving elements 1 and 2 in opposite directions relative to stationary element 3 (identical movements simultaneously taking place with respect to elements 6, 5, and 4 in the rear half of the lens) and by moving the entire lens assembly as a whole in an axial direction, the magnification may be varied while maintaining a constant total distance from object to image.

19 Claims, 8 Drawing Figures

PATENTED AUG 29 1972 3,687,522

VARIABLE MAGNIFICATION LENS SYSTEM FOR FINITE CONJUGATE DISTANCES

BACKGROUND OF THE INVENTION

The invention relates to a variable magnification optical system, conveniently referred to as a lens system. More specifically, the invention may be called a finite conjugate zoom lens, capable of maintaining a fixed total distance of object to image while producing a variation in the magnification of the image, at relatively close conjugate distances. A lens system having these characteristics is particularly useful, for example, in copying work, or process camera work, or the like, since it enables an object (e.g., a document to be copied) to be set at a fixed distance from a piece of film or other image plane and then, by adjustment of the lens, the size of the image produced on the image plane can be varied as desired without moving the object or the image plane. An optical system of this type is very useful not only in the above mentioned fields of process camera work and photocopy work (including microfilming) but also in oscillography and related fields in which the lens system may serve as a photographic objective. The system can also be adapted as a variable magnification relay objective, and it has application in catadioptric systems, boresight systems, and telescopic systems as well. Thus, with a lens system of the present type, one would have the capability of adjusting the system to give wide angle coverage for easy location of a desired object in the field, and when the object has been located and imaged in the image plane, the variable magnification zoom system of the present invention can be used for viewing and boresighting.

A zoom lens is usually defined as an optical objective in which the repositioning of some of its component parts results in a change in magnification of the image. The customary photographic objective type of zoom lens also has the property of maintaining a constant focal plane (image plane) while the magnification is varied, sometimes referred to as a constant back focus. Such zoom objectives are well known in the art, being disclosed in numerous patents and technical publications.

Such zooming photographic objectives usually have a relatively short back focus, and are designed to operate at front focal distances varying from infinity to several feet, the minimum front focal distance in any event being several times the back focus, so that such lenses can not be used and are not intended to be used for copying at any ratio approaching unity or full-size reproduction. As distinguished from these known zoom lenses, an important novel feature of the present invention lies in its ability to perform the zooming function of changing the magnification, and at the same time maintaining a constant total finite object to image conjugate distance, while working at relatively close conjugate distances such as in copying work or the like, in the magnification range of substantially 0.57X to 1.75X. Thus, for close conjugate application, the lens system of the present invention has the advantage that only one objective is required to obtain a wide range of variation in magnification of the image, while the constant object to image distance eliminates the necessity of refocusing as magnification changes are effected. For purposes of the present application, the term "close conjugate distances" means front and back conjugate distances of not more than about 6 times the focal length of the lens system. The present lens system is not intended to operate at infinity or at any relatively large focal distance.

An object of the present invention is the provision of a zoom lens suitable for use in a close conjugate optical system.

Another object is the provision of a zoom lens capable of maintaining a constant total object to image distance throughout a range of variation of magnification from 1:1X to at least 1:0.65X, or preferably to 1:0.57X.

Still another object is the provision of a generally improved and more satisfactory symmetrical lens of the inverse Gauss type.

Yet another object is the provision of a lens of this type which has a high image quality throughout its entire range of magnification.

A further object is the provision of a lens of the inverse Gauss type which is well corrected for astigmatism and monochromatic aberrations over a total field angle of 46°, and which is so designed as to have no loss of illumination due to vignetting over this total field angle when used at a maximum aperture of $f/5.6$.

A still further object is the provision of a zoom lens which is well corrected for field curvature in the plane of best definition, and for distortion, so that it is suitable for photocopying purposes.

Another object is the provision of a zoom lens which can be used as a continuously variable zoom system over the entire range of magnification, or can be used at discreet magnifications, and whose zooming movement can be either linear or non-linear.

Still another object is the provision of a symmetrical lens serving to correct the transverse aberrations of distortion, coma, an lateral color, and so designed that it tends to minimize the necessary manufacturing tooling costs and to minimize the inventory of parts.

Another object is the provision of a symmetrical lens which provides the inverse magnification range of 1X to substantially 1.5X or preferably to 1.75X, when the lens is properly positioned along the optical axis.

DESCRIPTION OF THE PREFERRED EMBODIMENT

Figure 1:
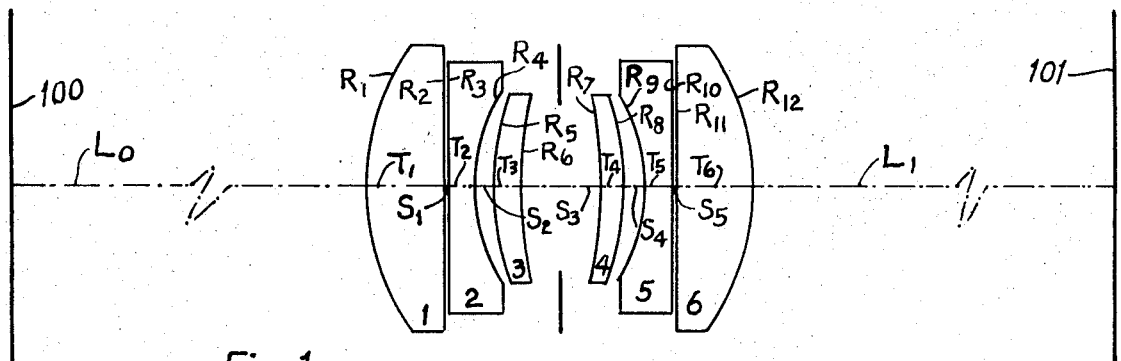
FIG. 1 is a diagram of a lens according to a first embodiment of the invention, with the parts adjusted for unit magnification or a ratio of 1:1.

As already indicated the preferred embodiment of the lens system according to the present invention is a lens of six components, all air spaced from each other, arranged in a truly symmetrical manner and collectively forming a lens of the inverse Gauss type. Elements 1 and 6 are plano-convex, elements 2 and 5 are plano-concave, and elements 3 and 4 are meniscus lenses. The three rear elements 6, 5, and 4 are reverse duplicates of the three front elements 1, 2 and 3 respectively, and of course are reversely faced.

As already mentioned, the lens system is not intended for use as an ordinary photographic objective, where the forward conjugate distance is much greater than the rear conjugate distance or back focus and frequently approaches theoretical infinity. On the contrary, the present lens system is intended for use at what may be called finite conjugate distances or close conjugate distances, the meaning of these terms is used herein being that the longer conjugate distance is not more than about three times the shorter conjugate distance, and that neither conjugate distance is more than 3 feet in length, and preferably not more than 2 feet in length. Within these working distances, the present lens system gives excellent images of high quality, and moreover enables the total conjugate distance (object to image) to remain constant while the lens system is adjusted to give different magnification ratios without requiring any repositioning of the object or the image plane (e.g., film plane).

According to the invention, the two central elements (elements 3 and 4) are mounted in fixed position in the lens mount and do not move relative to each other, the stop or diaphragm being placed midway between them. For focusing, the entire lens mount is moved axially. During adjustment of the lens system to obtain different degrees of magnification, the entire lens mount is moved axially, and in addition elements 1 and 2 are moved axially in opposite directions relative to stationary element 3, similar movements place for elements 6 and 5 with respect to stationary element 4. Since the lens system is truly symmetrical, and the adjusting to the adjusting movements of the front half, it does not matter which end of the lens is faced forwardly. It is merely for convenience, and in accordance with customary practice in describing lenses, that the elements are numbered in order from front to rear, for they could just as well be numbered from rear to front.

An important feature of the present lens system is the simultaneous movement of elements 1 and 2 in opposite directions relative to stationary element 3, with similar movements in the same fashion of rear elements 6 and 5 relative to stationary element 4. If during the adjustment to a different magnification, elements 2 and 5 were to remain stationary relative to elements 3 and 4, and elements 1 and 6 were simply moved axially farther away from their companion elements 2 and 5, respectively, this would produce a desired change in the equivalent focal length of the system, thereby permitting the system to be used at a different magnification while still maintaining the fixed total object to image conjugate distance, but this would be done at the expense of producing an inward or negative curving field which seriously degrades the image quality. Also, if elements 2 and 5 were moved axially closer to elements 3 and 4, respectively, while elements 1 and 6 remain stationary, this also would produce the desired change in the equivalent focal length of the system, again enabling the system to be used at a different magnification while still maintaining the fixed total object to image conjugate distance, but this would be done at the expense of introducing a backward or positive field curvature that is very detrimental to image quality. But according to the present invention, these difficulties are overcome by simultaneously moving elements 1 and 2 in opposite directions relative to stationary element 3, and at the same time moving elements 6 and 5 in the same fashion relative to stationary element 4. The negative field curvature introduced by moving elements 1 and 6 axially away from each other (and from their respective fixed elements 3 and 4) is counterbalanced by the positive field curvature introduced by moving elements 2 and 5 axially toward each other (and toward their respective fixed elements 3 and 4) with the result that no serious field curvature is produced, when the elements are adjusted to give a different magnification, and the image quality remains acceptably high. It may be mentioned, however, that although elements 1 and 2 move simultaneously in opposite directions during adjustment to a different magnification, they do not move through equal distances. This will be apparent from the numerical tables of spacings which are given below.

It should also be emphasized that the preferred embodiment of the invention now being described is one in which the movements for magnification adjustment are linear; that is, the axial movement of elements 2 and 5 are at a fixed ratio to the axial movements of elements 1 and 6, when the lens system is adjusted to a different magnification. This linear movement feature is advantageous because it permits the movements to be produced by suitable screw threads in the lens mount in which the elements are mounted. If the adjusting movements were non-linear, special cams would be required for producing the movements.

Referring now to FIG. 1, which is a diagram of a lens system according to this preferred embodiment, the respective lens elements are indicated by the numerals 1 through 6, numbered in sequence from front to rear in the conventional manner. The respective thicknesses are indicated, as usual in lens descriptions, by the letter T with a subscript corresponding to the number of the respective lens element. The respective axial spaces between adjacent elements are indicated by the letter S with a subscript, numbering the spaces consecutively from front to rear. The radii of curvature of the lens faces are indicated by the letter R and a subscript identifying the particular face, again numbered consecutively from front to rear in the customary manner. The object plane is indicated at 100, and the image plane at 101. The forward conjugate distance from the object plane 100 to the vertex of the first surface of lens element 1 is indicated at $L_o$, and the rear conjugate distance or back focus from the vertex of the last surface of the lens system to the image plane 101 is indicated by $L_1$. The same numerals used in FIG. 1 apply also to FIGS. 2 and 3, which show the same lens system in different positions of adjustment, but some of the numerals have been omitted from FIGS. 2 and 3, being unnecessary in those figures.

The numerical data for a typical example of a lens system in accordance with this embodiment of the invention are shown in table 1. As is customary in lens notations, plus values of R indicates surfaces convex toward the incident light and minus values indicate surfaces concave toward the incident light. The respective refractive indices of the individual elements are indicated by N, and are expressed with reference to the spectral D line of sodium. The dispersive indices or Abbe numbers are indicated by V. Both the indices of refraction and of dispersion are subscripted where necessary to identify the particular lens element. All linear dimensions are expressed in millimeters.

Table 1

| Lens | $N_D$ | V | Radii | Thicknesses |
|---|---|---|---|---|
| | | | | $L_o$ varies 344.10 to 561.60 |
| | | | $R_1 = +67.40$ | |
| 1 | 1.62032 | 60.3 | | $T_1 = 21.90$ |
| | | | $R_2 = \alpha$ | |
| | | | | $S_1$ varies 0.2 to 3.01 |
| | | | $R_3 = \alpha$ | |
| 2 | 1.54873 | 45.4 | | $T_2 = 8.15$ |
| | | | $R_4 = +48.84$ | |
| | | | | $S_2$ varies 5.26 to 3.95 |
| | | | $R_5 = +76.60$ | |
| 3 | 1.62032 | 60.3 | | $T_3 = 7.50$ |
| | | | $R_6 = +121.43$ | |
| | | | | $S_3 = 21.31$ |
| | | | $R_7 = -121.43$ | |
| 4 | 1.62032 | 60.3 | | $T_4 = 7.50$ |
| | | | $R_8 = -76.60$ | |
| | | | | $S_4$ varies 5.26 to 3.95 |
| | | | $R_9 = -48.84$ | |
| 5 | 1.54873 | 45.4 | | $T_5 = 8.15$ |
| | | | $R_{10} = \alpha$ | |
| | | | | $S_5$ varies 0.2 to 3.01 |
| | | | $R_{11} = \alpha$ | |
| 6 | 1.62032 | 60.3 | | $T_6 = 21.90$ |
| | | | $R_{12} = -67.40$ | |
| | | | | $L_1$ varies 561.60 to 344.10 |

A lens system constructed in accordance with the data given in foregoing Table 1 has an equivalent focal length or EFL of 254.785 millimeters, when the lens elements are adjusted for unit magnification. It has an aperture of $f/5.6$, and a total field angle of 46°.

Table 2 indicates the respective spacings when the lens elements are adjusted for various different magnifications from 0.65 to 1.0 or unity, and from unity to a magnification of 1.539. This Table 2 indicates not only the variable spacings internally of the lens, but also the variation in the front and rear conjugate distances, varied by moving the entire lens system as a whole in an axial direction.

TABLE 2

| Magnification | $S_1$ | $S_2$ | $S_4$ | $S_5$ | $L_0$ | $L_1$ |
|---|---|---|---|---|---|---|
| 0.65 | 3.010 | 3.950 | 3.950 | 3.010 | 561.600 | 344.100 |
| 0.70 | 2.0734 | 4.3866 | 4.3866 | 2.0734 | 543.145 | 363.555 |
| 0.75 | 1.4177 | 4.6923 | 4.6923 | 1.4177 | 526.700 | 380.700 |
| 0.85 | 0.5747 | 5.0853 | 5.0853 | 0.5747 | 495.080 | 413.220 |
| 1.0 | 0.200 | 5.260 | 5.260 | 0.200 | 454.350 | 454.350 |
| 1.175 | 0.5747 | 5.0853 | 5.0853 | 0.5747 | 413.220 | 495.080 |
| 1.333 | 1.4177 | 4.6923 | 4.6923 | 1.4177 | 380.700 | 526.700 |
| 1.426 | 2.0734 | 4.3866 | 4.3866 | 2.0734 | 363.555 | 543.145 |
| 1.539 | 3.010 | 3.950 | 3.950 | 3.010 | 344.100 | 561.600 |

It has been emphasized above that adjustment of this lens to provide various different magnifications does not result in any change of the total distance from the object plane 100 to the image plane 101, this being an important advantage in the practical use of the lens because when making copies, for example, the object to be copied and the film on which the copy is to be made can be placed in fixed holders at a fixed distance from each other, and the lens system may then be adjusted to obtain different magnifications without requiring any repositioning of either the object or the film. The truth of the statement that the distance from the object plane to the image plane remains constant, can be demonstrated by adding all of the various spacings along any horizontal line of Table 2, for any selected magnification, and it will be seen that regardless of which magnification is chosen, the sum of all these spacings, including the front and rear conjugate distances, is always the same.

It has already been noted that in this embodiment of the invention, the axial adjusting movements of the elements 2 and 5 have a linear relation to the axial adjusting movements of the elements 1 and 6, thereby permitting the adjusting movements to be performed by a relatively simple screw thread mechanism, without the need for the complicated cams which would be necessary if the ratio of movements was non-linear. One of the features of the present invention is that this ratio of axial movement of elements 1 and 6 relative to the axial movement of elements 2 and 5 is maintained within the ratio limits of 1.1:1 and 1.5:1. If this ratio is less than 1.1:1, then the effect of moving elements 2 and 5 becomes the determining influence on field curvature, and a backward curving field results, increasing in magnitude as the magnification changes. On the other hand, if this ratio is greater than 1.5:1, then the effect of moving elements 1 and 6 becomes the dominating or determining factor and an inward curving field results, increasing in magnitude as the magnification changes. However, if the movement ratio is kept within these limits of 1.1:1 and 1.5:1, a lens designer will have considerable latitude in changing other characteristics of the lens system, in the light of the present teaching, while still producing an image of acceptable quality. The general configuration of the basic lens design is at the discretion of the lens designer, restricted only by the requirement that it be so corrected optically as to give satisfactory performance when used throughout its entire range of magnification. Therefore, the invention is not intended to be limited to a lens having the exact dimensions and characteristics indicated in Table 1 and Table 2, but is intended to encompass lenses of the same general type having movements similar to those described above, with such changes in detail as may be desired by a skilled lens designer in the light of the present teaching.

The performance of a lens system constructed in accordance with the data in Table 1 and Table 2, is indicated in FIGS. 4–8, which are graphs of the kind known in the optical art as modulation transfer factor (or function) graphs or curves, commonly referred to as MTF curves. In each of these, the vertical height or ordinate represents the percent response, plotted against spatial frequency (in lines per millimeter) represented by the horizontal dimension or abscissa.

Figure 2:
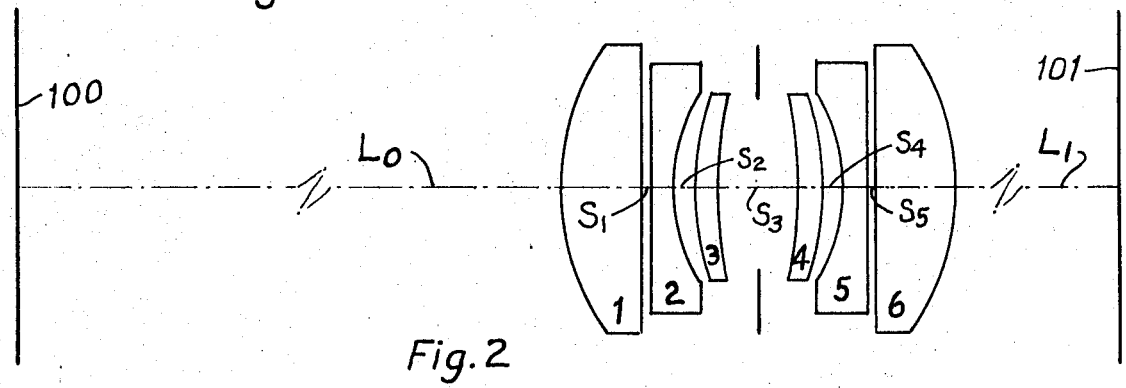
FIG. 2 is a diagram of the same lens with the parts adjusted for magnification of 1:0.75X.
Figure 3:
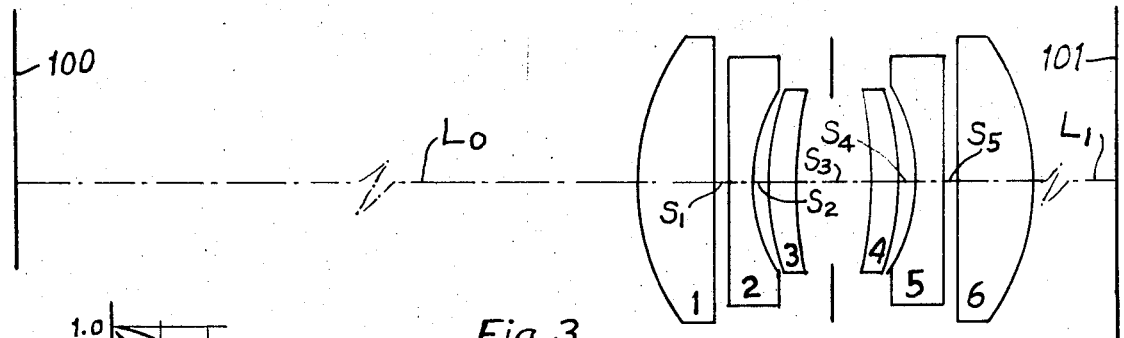
FIG. 3 is a similar view with the parts adjusted for magnification of 1:0.65X.

Each of these FIGS. 4–8 has three curves. In each case, the curve whose points are represented by dots indicates the performance when the lens system is adjusted for unit magnification, this being the position of the lens elements indicated in FIG. 1. (FIGS. 1–3 are drawn approximately but not necessarily exactly to scale, except that the conjugate distances to the object plane 100 and the image plane 101 are greatly reduced.) The curve whose points are indicated by the small triangles, in each of FIGS. 4–8, represents the performance when the lens system is adjusted for magnification of 0.75X, which is the position of the lens elements illustrated in FIG. 2, where it will be observed that the elements 1 and 6 have been moved farther away from their respective fixed elements 3 and 4, and the elements 2 and 5 have been moved closer to their respective fixed elements 3 and 4. In each of FIGS. 4–8, the curves whose points are indicated by the small circles show the performance when the lens elements are adjusted to a magnification of 0.65X, which is the position illustrated in FIG. 3, where it will be seen that the elements 1 and 6 have been moved still further away from their respective fixed elements 3 and 4, and the elements 2 and 5 have been moved still closer to their respective fixed elements 3 and 4, while the entire lens assembly has been moved still closer to the image plane 101 and farther from the object plane 100.

Figure 4:
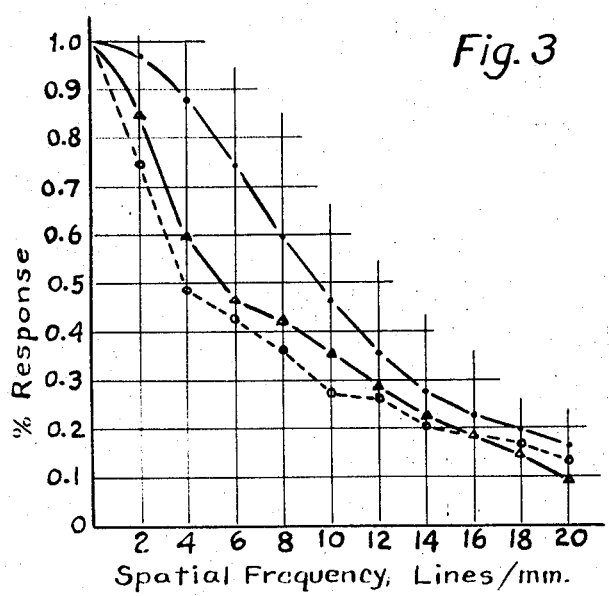
FIG. 4 is a graph of percent response plotted against spatial frequency for an aerial image in the plane of best focus at three field positions for the lens system according to the first embodiment of the invention, for axial rays.
Figure 5:
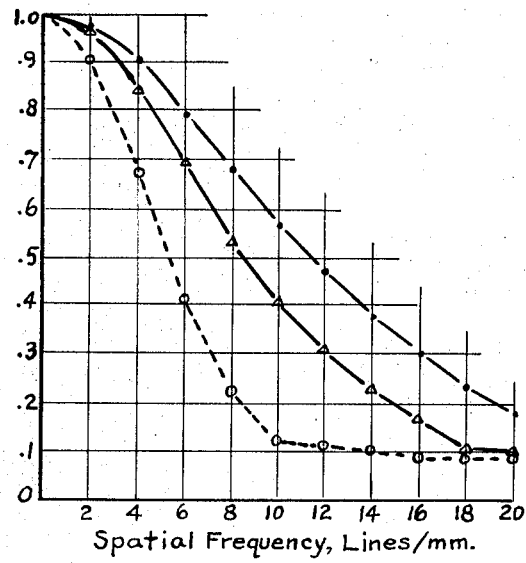
FIG. 5 is a similar graph giving data for the tangential filed at a half field angle of about 16°.
Figure 6:
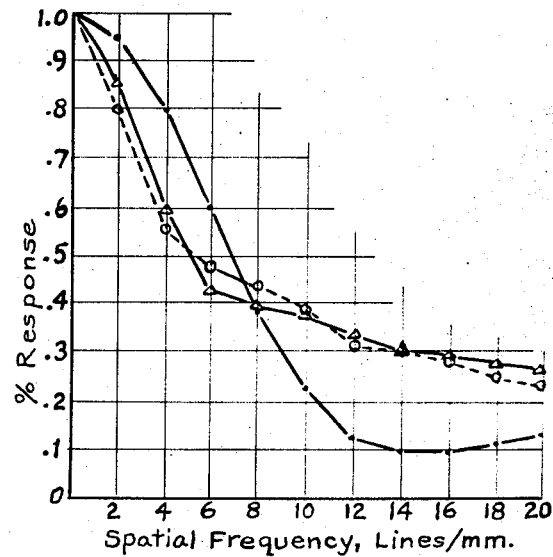
FIG. 6 is a similar graph showing the response for the sagittal field at the same half field angle of about 16°.

FIG. 4 shows the performance for an aerial image in the plane of best focus, for axial rays. FIG. 5 shows the MTF data for the tangential field for a field coverage of 16.1° on each side of the axis, or 32.2° total field angle. FIG. 6 gives the response for the sagittal field at the same position of 32.2° full field angle.

Figure 7:
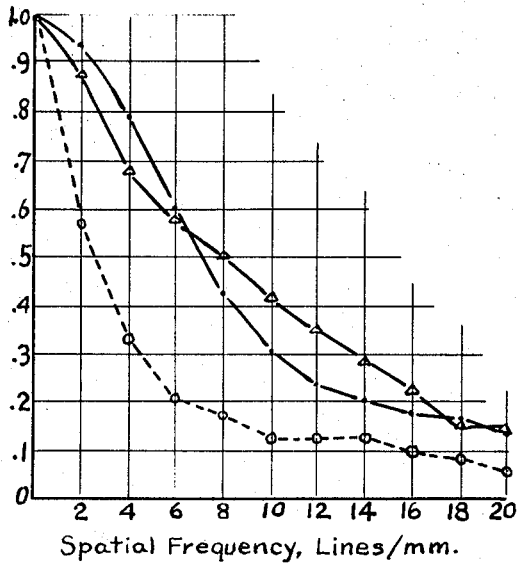
FIG. 7 is a similar graph giving data for the tangential field at the maximum half field angle of about 23°.
Figure 8:
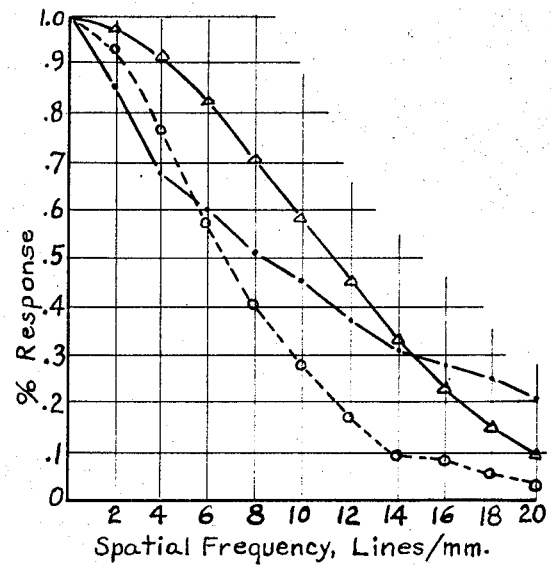
FIG. 8 is a similar graph giving date for the sagittal field at the same maximum half field angle of about 23°.

FIG. 7 shows the MTF data for the tangential field for an off-axes angular coverage of 23° half angle, or 46° total field angle. FIG. 8 gives the response for the sagittal field at the same angular coverage of 46° total angle.

These curves or graphs in FIGS. 4–8 will be readily understood by those skilled in the art, and such persons will readily observe the relatively high image quality of a lens system constructed and adjusted in accordance with the numerical data given in Table 1 and Table 2. It is believed that further comment regarding FIGS. 4–8 is unnecessary.

The diameters of the respective lens elements are not critical, and may be varied considerably. The preferred diameters are the following: elements 1 and 6, 78.5 millimeters. Elements 2 and 5, 69.0 millimeters. Elements 3 and 4, 51.0 millimeters. Elements 1 and 2 (likewise 5 and 6) could be of the same diameter if desired, but when elements 2 and 5 are made somewhat smaller, as in the preferred dimensions above mentioned, it gives a little more room for screw threaded sleeves for performing the various axial movements.

No attempt has been made to illustrate or to describe in detail the mechanical mounting of the lens elements or the screw thread mechanism for moving the various elements axially or for moving the entire lens assembly as a whole axially, when making adjustments to different powers of magnification. Such details of mounting and movement mechanism are well within the skill of a lens mounting engineer, once he has been provided with the information given above as to the dimensions and spacing of the various lens elements and the axial movements which they should perform during adjustment to different magnifications.

DESCRIPTION OF A SECOND EMBODIMENT

A second embodiment of the invention, as described below, gives a somewhat better image quality, but is considerably more expensive to manufacture. Therefore, where cost is an important factor, the first embodiment as described above is the preferred form. But for special uses where image quality is the prime consideration and outweighs the increased cost, the second embodiment described below would be preferred.

In this second embodiment, the individual lens elements are identical with those in the first embodiment, but the axial movements of the elements in order to vary the magnification power are different from those of the first embodiment. The axial movements in this second embodiment no longer have a linear relation to each other, as they had in the first embodiment. Therefore, the non-linear axial movements must be performed by cams of a somewhat complex nature, rather than by the simple screw threads. This is what makes the second embodiment more costly than the first. The non-linear movements which can be accomplished by cams do, however, improve the image quality.

In the second embodiment, the individual lens elements, including the nature of the glass, the radii of curvature, the thicknesses, and the diameters, are all identical with those of the first embodiment, and so it is believed unnecessary, in describing the second embodiment, to repeat the information already given in Table 1. Table 1 applies equally to the second embodiment, except as to the variation in spacing. In the second embodiment, $L_o$ varies from 343.18 to 562.58; $S_1$ varies from 0.2 to 3.064; $S_2$ varies from 5.26 to 3.896; $S_3$ remains the same, constant at 21.31; $S_4$ varies from 5.26 to 3.896; $S_5$ varies from 0.2 to 3.064; and $L_1$ varies from 562.58 to 343.18.

Table 3, given below, gives data as to the various spacings when the lens system of this second embodiment is adjusted to various different magnifications.

No separate diagram of the second lens system, similar to FIGS. 1–3, is given, for the reason that, as above stated, the lens elements themselves are identical and are arranged in the same order, and although the spacings are somewhat different, these differences are so slight they they would not be seen in diagrams of the kind shown in FIGS. 1–3. Therefore, FIGS. 1–3 are intended to apply to the lens system of the second embodiment as well as the lens system of the first embodiment, it being understood that these diagrams are approximately but not exactly to scale, and so they can illustrate, for the three different magnifications shown, either the spacings used in the first embodiment or the generally similar but slightly different spacings used in the second embodiment.

TABLE 3

| Magnification | $S_1$ and $S_5$ | $S_2$ and $S_4$ | $L_o$ | $L_1$ |
|---|---|---|---|---|
| 0.65 | 3.064 | 3.896 | 562.58 | 343.18 |
| 0.70 | 2.033 | 4.427 | 542.30 | 364.43 |
| 0.75 | 1.350 | 4.760 | 524.79 | 382.63 |
| 0.85 | 0.543 | 5.117 | 493.43 | 414.90 |
| 1.0 | 0.200 | 5.260 | 454.35 | 454.35 |
| 1.175 | 0.543 | 5.117 | 414.90 | 493.43 |
| 1.333 | 1.350 | 4.760 | 382.63 | 524.79 |
| 1.426 | 2.033 | 4.427 | 364.43 | 542.30 |
| 1.539 | 3.064 | 3.896 | 343.18 | 562.58 |

Those skilled in the art will recognize, from analysis of Table 3, that the ratio of the movements of elements 1 and 6 to the movements of elements 2 and 5 is not a fixed or linear ratio, but varies in different parts of the magnification range. Therefore, as already indicated, these movements cannot be performed by simple and inexpensive screw thread means, but must be performed by somewhat complicated and more costly cams. Given the information provided in Table 3, any skilled lens mount engineer can design the lens mount, including the cams, for accomplishing the motions specified in Table 3.

In both embodiments of the invention, the magnification varies continuously throughout the range, and the lens system may be used at any desired magnification within the limits, not necessarily just at the specific magnifications indicated in Tables 2 and 3.

Tables 2 and 3 show the spacings for various magnifications from 0.65X to 1.539X. These are the ranges for which the present lenses are especially intended. However, they are not the absolute limits. Acceptably good results, for most purposes, may be obtained from the present lenses within the magnification range from substantially 0.57X to substantially 1.754X. To go to these limits, beyond the limits specifically tabulated in Tables 2 and 3, the movements of the elements are simply continued in the same directions, approximately proportionately to the movements within the limits of Tables 2 and 3, in a manner which will be readily apparent to skilled lens designers when given the information herein disclosed.

Also it is to be understood that the optical system is capable of being ratioed up or down, within the skill of a competent lens designer supplied with the present disclosure as a starting point.

It was mentioned above that an object of the invention is to minimize tooling costs and inventory of parts. This is accomplished, in both embodiments of the invention, by using only two kinds of glass (elements 1, 3, 4, and 6 all being of the same glass, elements 2 and 5 being of a different glass) and by having only three different elements to be manufactured in quantity and carried in stock. It is further accomplished, in the first embodiment, by so designing the elements that acceptably good images can be produced by moving the elements in a linear ratio by screw threads, rather than by cams which are more costly to make and to tool up.

What is claimed is:

1. A variable magnification lens system for operation at relatively close conjugate distances comprising six lens elements, all air spaced, arranged symmetrically, elements 1 and 6 (as numbered consecutively from front to rear) having positive power, elements 2 and 5 having negative power, the central elements 3 and 4 having positive power and being at a fixed axial distance from each other, characterized by the fact that said system is movable as a unit between fixed object and image planes, while elements 1 and 6 are simultaneously movable away from each other through equal distances to vary the magnification, such movement introducing curvature of field in one direction, and while elements 2 and 5 are simultaneously movable toward each other through equal distances to vary the magnification, such movement introducing curvature of field in an opposite direction, the curvature produced by movement of elements 1 and 6 being approximately compensated by the curvature produced by movement of elements 2 and 5.

2. A lens system as defined in claim 1, wherein elements 1 and 6 are plano-convex elements with their convex surfaces faced outwardly away from each other, and elements 2 and 5 are plano-concave elements with their concave surfaces faced inwardly toward each other.

3. A lens system as defined in claim 2, wherein elements 3 and 4 are meniscus elements with concave surfaces faced inwardly toward each other.

4. A lens system as defined in claim 1, wherein the axial distance of movement of elements 1 and 6, for producing any given change in magnification, is greater than the axial distance of movement of elements 2 and 5, for producing the same change in magnification.

5. A lens system as defined in claim 4, wherein the ratio of the axial movement of elements 1 and 6 to the axial movement of elements 2 and 5 is within the limits of 1.1:1 and 1.5:1.

6. A lens system as defined in claim 1, wherein the ratio of the axial movement of elements 1 and 6 to the axial movement of elements 2 and 5 is a linear ratio.

7. A lens system as defined in claim 1, wherein ratio of the axial movement of elements 1 and 6 to the axial movement of elements 2 and 5 is a non-linear ratio.

8. A lens system as defined in claim 1, wherein the powers of the respective lens elements are so chosen and the axial movements of the elements relative to each other for varying the magnification are so chosen that the total distance from an object to an image thereof formed by said lens system is substantially constant at all magnifications within the range of magnification variation.

9. A lens system as defined in claim 8, wherein said range of magnification variation is substantially 0.57X to 1.754X.

10. A lens system as defined in claim 9, wherein the conjugate distance from the lens system to the object and also to the image is not more than six times the equivalent focal length of the system.

11. A variable magnification lens system consisting essentially of six lens elements, all air spaced arranged symmetrically, the characteristics of the elements and their spatial relationship to each other being substantially in the proportions indicated by the data in the following table:

| Lens | $N_D$ | V | Radii | Thicknesses |
|---|---|---|---|---|
| 1 | 1.62032 | 60.3 | $R_1 = +67.40$ | $T_1 = 21.90$ |
|   |   |   | $R_2 = \alpha$ | $S_1$ varies |
|   |   |   | $R_3 = \alpha$ |   |
| 2 | 1.54873 | 45.4 |   | $T_2 = 8.15$ |
|   |   |   | $R_4 = +48.84$ | $S_2$ varies |
|   |   |   | $R_5 = +76.60$ |   |
| 3 | 1.62032 | 60.3 |   | $T_3 = 7.50$ |
|   |   |   | $R_6 = +121.43$ | $S_3 = 21.31$ |
|   |   |   | $R_7 = -121.43$ |   |
| 4 | 1.62032 | 60.3 |   | $T_4 = 7.50$ |
|   |   |   | $R_8 = -76.60$ | $S_4$ varies |
|   |   |   | $R_9 = -48.84$ |   |
| 5 | 1.54873 | 45.4 |   | $T_5 = 8.15$ |
|   |   |   | $R_{10} = \alpha$ | $S_5$ varies |
|   |   |   | $R_{11} = \alpha$ |   |
| 6 | 1.62032 | 60.3 |   | $T_6 = 21.90$ |
|   |   |   | $R_{12} = -67.40$ |   | wherein the lens elements are numbered in order from front to rear, the refractive indices of the respective elements for the D line of sodium are given in the column headed $N_D$, the corresponding Abbe dispersive indices are given in the column headed V, the respective radii of curvature of the lens surfaces are indicated by R with a subscript numeral identifying the particular lens surface as numbered consecutively from front to rear, the respective axial thicknesses of the lenses are indicated by T with a subscript numeral identifying the particular lens, and the respective axial spaces between lenses are indicated by S with a subscript numeral identifying the particular space as numbered consecutively from front to rear, the linear dimensions of radii, thicknesses and spacings being expressed proportionately in units of the same length.

12. A lens system as defined in claim 11 wherein, to obtain variation in magnification when the system is used for relatively close conjugate distances, $S_1$ and $S_5$ may be varied from about 0.200 to about 3.064, and $S_2$ and $S_4$ may be varied from about 5.260 to about 3.896, $S_1$ and $S_5$ increasing as $S_2$ and $S_4$ decrease, and vice versa.

13. A lens system as defined in claim 12 wherein, to obtain variations in magnification, the ratio of the axial movements of lens elements 1 and 6 to the axial movements of elements 2 and 5 is within the limits of 1.1:1 and 1.5:1.

14. A lens system as defined in claim 13 wherein the axial movements of elements 1 and 6, when varying the magnification from one power to another, are in a linear ratio to the axial movements of elements 2 and 5.

15. A lens system as defined in claim 13 wherein the axial movements of elements 1 and 6, when varying the magnification from one power to another, are in a non-linear ratio to the axial movements of elements 2 and 5.

16. A lens system as defined in claim 11 wherein, to obtain variation in magnification to the powers indicated in the following table, the spaces $S_1$, $S_2$, $S_4$, and $S_5$ are varied to the proportionate values indicated in the following table:

| Magnification | $S_1$ and $S_5$ | $S_2$ and $S_4$ |
|---|---|---|
| 0.65 | 3.010 | 3.950 |
| 0.70 | 2.0734 | 4.3866 |
| 0.75 | 1.4177 | 4.6923 |
| 0.85 | 0.5747 | 5.0853 |
| 1.0 | 0.200 | 5.260 |
| 1.175 | 0.5747 | 5.0853 |
| 1.333 | 1.4177 | 4.6923 |
| 1.426 | 2.0734 | 4.3866 |
| 1.539 | 3.010 | 3.950 |

17. A lens system as defined in claim 16 wherein, for the magnification powers indicated in claim 16, the conjugate distances from the lens system to the object and to the image are adjusted to the proportionate distances indicated in the columns headed $L_0$ and $L_1$, respectively in the following table:

| Magnification | $L_0$ | $L_1$ |
|---|---|---|
| 0.65 | 561.600 | 344.100 |
| 0.70 | 543.145 | 363.555 |
| 0.75 | 526.700 | 380.700 |
| 0.85 | 495.080 | 413.220 |
| 1.0 | 454.350 | 454.350 |
| 1.175 | 413.220 | 495.080 |
| 1.333 | 380.700 | 526.700 |
| 1.426 | 363.555 | 543.145 |
| 1.539 | 344.100 | 561.600 |

18. A lens system as defined in claim 11 wherein, to obtain variation in magnification to the powers indicated in the following table, the spaces $S_1$, $S_2$, $S_4$, and $S_5$ are varied to the proportionate values indicated in the following table:

| Magnification | $S_1$ and $S_5$ | $S_2$ and $S_4$ |
|---|---|---|
| 0.65 | 3.064 | 3.896 |
| 0.70 | 2.033 | 4.427 |
| 0.75 | 1.350 | 4.760 |
| 0.85 | 0.543 | 5.117 |
| 1.0 | 0.200 | 5.260 |
| 1.175 | 0.543 | 5.117 |
| 1.333 | 1.350 | 4.760 |
| 1.426 | 2.033 | 4.427 |
| 1.539 | 3.064 | 3.896 |

19. A lens system as defined in claim 18 wherein, for the magnification powers indicated in claim 18, the conjugate distances from the lens system to the object and to the image are adjusted to the proportionate distances indicated in the columns headed $L_0$ and $L_1$, respectively, in the following table:

| Magnification | $L_0$ | $L_1$ |
|---|---|---|
| 0.65 | 562.58 | 343.18 |
| 0.70 | 542.30 | 364.43 |
| 0.75 | 524.79 | 382.63 |
| 0.85 | 493.43 | 414.90 |
| 1.0 | 454.35 | 454.35 |
| 1.175 | 414.90 | 493.43 |
| 1.333 | 382.63 | 524.79 |
| 1.426 | 364.43 | 542.30 |
| 1.539 | 343.18 | 562.58 |

* * * * *